United States Patent

Douglass

[15] 3,635,822

[45] Jan. 18, 1972

[54] DRILLING FLUID

[72] Inventor: Jack H. Douglass, Bellaire, Tex.
[73] Assignee: Texaco Inc., New York, N.Y.
[22] Filed: Nov. 7, 1969
[21] Appl. No.: 874,953

[52] U.S. Cl. .................................. 252/8.5 A, 252/8.5 C
[51] Int. Cl. .............................................. C10m 3/34
[58] Field of Search ................. 252/8.5 A, 8.5 B, 8.5 C

[56] References Cited

UNITED STATES PATENTS

| | | | |
|---|---|---|---|
| 2,802,783 | 8/1957 | Weiss et al. | 252/8.5 |
| 2,856,154 | 10/1958 | Weiss et al. | 252/8.5 X |
| 2,987,298 | 6/1961 | Walker et al. | 252/8.5 X |

*Primary Examiner*—Herbert B. Guynn
*Attorney*—Thomas H. Whaley, Carl G. Ries and James F. Young

[57] ABSTRACT

A method of restoring the physical properties to a shale control drilling fluid containing a dihydroxynaphthalenesulfonic acid dispersant wherein the hydroxyl groups are in adjacent positions to each other on the same ring and the sulfonic acid group is on either ring that has been detrimentally effected by exposure to high-drilling temperatures above about 250° F., which comprises stirring said heated drilling fluid and adding thereto a minor amount of calcium hydroxide.

3 Claims, No Drawings

DRILLING FLUID

The present invention relates to an improved aqueous drilling fluid for drilling wells through subsurface formations by means of well-drilling tools, and particularly to such an aqueous well-drilling fluid having improved properties. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shutdowns in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry out cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In commonly assigned U.S. Pat. No. 2,802,783, there is disclosed an improved drilling fluid useful for drilling through troublesome shale formations of the heaving, sloughing or rapidly dispersing type. The drilling fluid is comprised of an alkaline aqueous phase (filtrate phase) which is substantially saturated with respect to calcium hydroxide and which contains a water-soluble calcium salt having a solubility in said aqueous phase greater than that of calcium hydroxide dissolved therein in an amount sufficient to yield a calcium ion concentration in said aqueous phase of at least about 200 parts per million.

A drilling fluid for use in accordance with U.S. Pat. No. 2,802,783 would contain water, a hydratable drilling fluid clay dispersed in the aqueous phase by a drilling fluid dispersant, a water-soluble calcium salt having a solubility greater than calcium hydroxide therein in an amount sufficient to provide a calcium ion concentration of at least 200 parts per million by weight and wherein the aqueous phase is substantially saturated with an alkalinity agent such as calcium hydroxide. The drilling fluid also may contain other additive materials such as weighting agents, water loss agents, emulsifiers and the like.

It is known from copending, commonly assigned patent application, Ser. No. 351,844, filed Mar. 13, 1964, now abandoned, entitled "Drilling Fluid" that dihydroxy naphthalene sulfonic acid compounds such as 2,3-dihydroxy-,3,4-dihydroxy-,5,6-dihydroxy-, 6,7-dihydroxy-, and 7,8-dihydroxy-1-naphthalenesulfonic acid, 3,4-dihydroxy-,5,6-dihydroxy-,6,7-dihydroxy-, and 7,8-dihydroxy-2-naphthalenesulfonic acid, the corresponding water-soluble alkali metal, ammonium, and alkaline earth metal salts, and the corresponding naphthoquinone sulfonic acid compounds, are effective drilling fluid dispersants.

It has been found that shale control drilling fluids are susceptible to deterioration in drilling fluid properties after exposure to relatively high temperatures, i.e., above about 250° F., after several hours exposure to such temperatures, particularly with respect to a pronounced increase in the viscosity of the mud system. This abnormal increase in viscosity is usually sufficient to cause gellation and/or solidification of the mud system with the result that drilling operations are materially impaired.

Previous attempts to overcome this detrimental property of a shale control drilling fluid have met with little or no success. These attempts include thinning the mud system with additional amounts of dispersant but this method is quite expensive in use of dispersant and the results obtained are not long lasting.

As a result of this deficiency at high operating temperatures, a shale control drilling fluid is not suitable for use in drilling operations where such temperatures are encountered.

It has now been discovered that the adverse effects of high temperatures on a shale control drilling fluid can be overcome or materially decreased by adding to the shale control drilling fluid containing as the dispersant a dihydroxynaphthalenesulfonic acid compound of the prescribed type, a minor amount of calcium hydroxide and intimately agitating said treated drilling fluid for a period of time by mechanical or other mixing means.

As a result of the above-described chemical treatment and mixing, one is able to restore to the shale control drilling fluid its desirable properties, particularly with respect to the desirable low yield point and apparent viscosity values.

This phenomenon is not applicable to other drilling fluids which do not respond to such treatment.

The calcium hydroxide additive is incorporated in the shale content drilling fluid in amounts of from about 10 to about 50 percent by weight, per part of dispersant with amounts of from 20 to about 42 percent being preferred.

It is surprising that the addition of minor amounts of calcium hydroxide to a shale control drilling fluid containing as the dispersant a dihydroxynaphthalenesulfonic acid dispersant of prescribed type that has been exposed to high temperatures will restore the physical properties of the drilling fluid to a usable state since the addition of calcium hydroxide to a shale control mud similarly exposed and containing a conventional dispersant such as a calcium lignosulfonate known by the trade name "Kembreak," or a ferrochrome lignosulfonate known by the trade name "Q-Broxin" is ineffective in restoring the physical properties of the drilling fluid.

The following is a description by way of example of carrying out the present invention.

The drilling fluid employed as the base mud in the following examples was a top hole base mud obtained from a commercial drilling operation. The properties of the base mud are shown in table I below.

The following table I summarizes the results of tests performed on a shale control drilling fluid to demonstrate the effectiveness of the method of reconstituting this mud system after exposure to high temperatures. The components were added on a pound per barrel basis.

TABLE I

| Example | Additive | | | Fann viscosity | | P.V., cpe. | Y.P., cpe. | A.P., cpe. | pH | Ca++, p.p.m. | Time, hours | High temp., shear, #/100 ft.² |
|---|---|---|---|---|---|---|---|---|---|---|---|---|
| | Dispersant | Ca(OH)$_2$ | CaCl$_2$ | 600 | 300 | | | | | | | |
| Base mud "A" | | | | 45 | 35 | 10 | 25 | 22.5 | | | | |

TABLE 1 — Continued

| | | Additive | | | Fann viscosity | | | | | | | | High |
|---|---|---|---|---|---|---|---|---|---|---|---|---|---|
| | Example | Dispersant | Ca(OH)$_2$ | CaCl$_2$ | 600 | 300 | P.V., cpe. | Y.P., cpe. | A.P., cpe. | pH | Ca$^{++}$, p.p.m. | Time, hours | temp., shear, #/100 ft.$^2$ |
| 1 | "A" | 2.5 | 2.5 | | 59 | 54 | 5 | 49 | 29.5 | 12.4 | | 0.25 | |
| | | $^1$DHNS | | | 19 | 9 | 10 | −1 | 9.5 | 12.5 | 640 | 2.0 | |
| | | | | | 13 | 5 | 8 | −3 | 6.5 | 12.3 | 680 | 16 | |
| | | 16 hour sample bombed 8 hours at 300° F. | | | | | | | | | | 24 | 260 |
| | Reslurry | | | | 83 | 77 | 6 | 71 | 41.5 | | | 24.25 | |
| | | | 0.5 | | 22 | 10 | 12 | −2 | 11 | | | 24.50 | |
| 2 | "A" | 2.0 | 2.5 | 0.3 | 68 | 63 | 5 | 58 | 34 | 12.3 | | 0.25 | |
| | | DHNS | | | 21 | 10 | 11 | −1 | 10.5 | 12.3 | 840 | 2.0 | |
| | | | | | 15 | 6 | 9 | −3 | 7.5 | 12.3 | 792 | 16 | |
| | | 16 hours sample bombed 8 hours at 300° F. | | | | | | | | | | 24 | 310 |
| | Reslurry | | | | 108 | 96 | 12 | 84 | 54 | | | 24-25 | |
| | | | 0.5 | | 28 | 14 | 14 | 0 | 14 | | | 24-50 | |
| 3 | "A" | 1.2 | 2.5 | 0.3 | 79 | 75 | 4 | 71 | 39.5 | 12.4 | | 0.25 | |
| | | DHNS | | | 25 | 16 | 9 | 7 | 12.5 | 12.3 | 496 | 2.0 | |
| | | | | | 18 | 7 | 11 | −4 | 9 | 12.3 | 560 | 16 | |
| | | 16 hours sample bombed 8 hours at 300° F. | | | | | | | | | | 24 | 380 |
| | Reslurry | | | | 92 | 82 | 10 | 72 | | | | 24-25 | |
| | | | 0.5 | | 36 | 24 | 12 | 12 | | | | 24-50 | |
| 4 | "A" | 2.0 | 2.5 | | 53 | 48 | 5 | 43 | 26.5 | | | 0.25 | |
| | | DHNS | | | 20 | 10 | 10 | 0 | 10 | 12.4 | 880 | 1.0 | |
| | | | | | 13 | 5 | 8 | −3 | 6.5 | 12.5 | 680 | 16 | |
| | | 16 hours sample bombed 8 hours at 300° F. | | | | | | | | | | | 260 |
| | Reslurry | | | | 96 | 88 | 8 | 80 | 48 | | | 24 | |
| | | | 1.0 | | 60 | 31 | 29 | 2 | 30 | | 704 | 24-25 | |

$^1$ DHNS=6,7-dihydroxy-2-naphthalenesulfonic acid sodium salt.

The term "Reslurry" in the table refers to a sample of the drilling fluid that was mechanically stirred for about 15 minutes (0.25 hour) after being subjected to the high-temperature test.

Inspection of the data in table I above shows that a shale control drilling fluid containing 6,7-dihydroxy-2-naphthalenesulfonic acid as the dispersant possesses excellent drilling fluid properties as is evidenced by the low Yield Point and Apparent Viscosity values obtained, particularly, after 2 and 16 hours. The table also shows that subjecting the drilling fluid to a temperature of 300° F. for 8 hours results in a loss of desirable drilling fluid properties as is evidenced from the high Yield Point and Apparent Viscosity values reported in the table which were obtained on the reslurried drilling fluid after stirring for 15 minutes.

The table further shows that the addition of a minor amount of calcium hydroxide to the reslurried drilling fluid system results in the restoration and/or reconstitution of the drilling fluid in terms of improved Apparent Viscosity values. Such treatment permits the drilling fluid to be reused without addition of further amounts of dispersant. Heretofore it was necessary to add a considerable quantity of dispersant to the solidified mud system in order to reconstitute same.

The following table II shows the results of comparative tests on two different commercially available dispersants, sold under the trade names "Kembreak," a calcium lignosulfonate and "Q-Broxin," a ferrochrome lignosulfonate, in a shale control drilling fluid that has been adversely effected in its physical properties by exposure to high temperatures for more than several hours.

There is also included in the table results of a test on the dispersant 6,7-dihydroxy-2-naphthalenesulfonic acid sodium salt in the same drilling fluid, after exposure to the same high temperature for the same time period.

TABLE II

| | Example | Dispersant | Ca(OH)$_2$ | CaCl$_2$ | 600 | 300 | P.V., cpe. | Y.P., cpe. | A.P., cpe. | pH | Ca$^{++}$, p.p.m. | Time, hours | High temp., shear, #/100 ft.$^2$ |
|---|---|---|---|---|---|---|---|---|---|---|---|---|---|
| | Base mud "A" | | | | 41 | 33 | 8 | 25 | 20.5 | | | | |
| 5 | "A" | 3.5 | 3.0 | 1.0 | 68 | 60 | 8 | 52 | 34 | 12.3 | | 0.25 | |
| | | $^1$DHNS | | | 23 | 11 | 12 | −1 | 11.5 | 12.3 | 164 | 2.0 | |
| | | | | | 15 | 7 | 8 | −1 | 7.5 | 12.2 | 1,648 | 16 | |
| | | 16 hour sample bombed 8 hours at 300° F. | | | | | | | | | | 24 | 310 |
| | Reslurry | | | | 87 | 72 | 15 | 57 | 43.5 | | | 24.25 | |
| | | | 0.5 | | 38 | 22 | 16 | 6 | 19 | | | 24.50 | |
| A | "A" | 3.5 | 3.0 | 1.0 | 107 | 96 | 11 | 85 | 53.5 | 12.4 | | 0.25 | |
| | | $^2$Q-B | | | 61 | 43 | 18 | 25 | 30.5 | 12.3 | 376 | 2.0 | |
| | | | | | 63 | 35 | 28 | 7 | 31.5 | 12.1 | 720 | 16 | |
| | | 16 hour sample bombed 8 hours at 300° F. | | | | | | | | | | 24 | 390 |
| | Reslurry | | | | 218 | 207 | 11 | 196 | 109 | | | 24.25 | |
| | | | 0.5 | | 221 | 208 | 13 | 195 | 110.5 | | | 24.50 | |
| B | "A" | 3.5 | 3.0 | 1.0 | 88 | 73 | 15 | 58 | 44 | 12.4 | | 0.25 | |
| | | $^3$Kemb. | | | 55 | 36 | 19 | 17 | 27.5 | 12.3 | 528 | 2.0 | |
| | | | | | 69 | 38 | 31 | 7 | 34.5 | 12.2 | 624 | 16 | |
| | | 16 hour sample bombed 8 hours at 300° F. | | | | | | | | | | 24 | 600 |
| | Reslurry | | | | 204 | 189 | 15 | 174 | 102 | | | 24.25 | |
| | | | 0.5 | | 182 | 165 | 17 | 148 | 91 | | | 24.50 | |

$^1$ DHNS=6,7-dihydroxy-2-naphthalenesulfonic acid sodium salt.
$^2$ Q-B=Q-Broxin.
$^3$ Kemb.=Kembreak.

The data in table II above show that high temperatures adversely effect shale control drilling fluid containing the commercial dispersants, Kembreak and Q-Broxin. In examples A and B, respectively, the very high Yield Point and Apparent Viscosity values after reslurrying, are not changed substantially, by the addition of a small amount of calcium hydroxide thereto.

In contrast, in example 5, the addition of a similar quantity of calcium hydroxide to the shale control drilling fluid containing the dihydroxynaphthalenesulfonic acid dispersant causes a material reduction in Yield Point and Apparent Viscosity values.

I claim:

1. A method of restoring the physical properties to a shale control drilling fluid containing a dihydroxynaphthalenesulfonic acid dispersant wherein the hydroxyl groups are in adjacent positions to each other on the same ring and the sulfonic acid group is on either ring, that has been detrimentally affected by exposure to high drilling temperatures above about 250° F., said drilling fluid comprising an alkaline aqueous phase which is substantially saturated with respect to calcium hydroxide and which contains a water-soluble calcium salt having a solubility in said aqueous phase greater than that of calcium hydroxide dissolved therein in an amount sufficient to yield a calcium ion concentration in said aqueous phase of at least about 200 parts per million, which comprises stirring said heated drilling fluid and adding thereto calcium hydroxide in an amount of from about 10 to about 50 percent by weight, based on the weight of the drilling fluid dispersant.

2. A method as claimed in claim 1 wherein the dispersant is 6,7-dihydroxy-2-naphthalenesulfonic acid..

3. A method as claimed in claim 1 wherein the calcium hydroxide additive is employed in an amount of from about 20 to about 42 percent by weight, based on the weight of the drilling fluid.

* * * * *

PO-1050
(5/69)

UNITED STATES PATENT OFFICE
CERTIFICATE OF CORRECTION

Patent No. 3,635,822      Dated     January 18, 1972

Inventor(s)     Jack H. Douglass

It is certified that error appears in the above-identified patent and that said Letters Patent are hereby corrected as shown below:

Col. 1, line 59    After "hydroxide" add --dissolved--
Col. 2, line 37    After "desirable" add --drilling-
Col. 4, line 17    Change "24-25" to --24.25--
Col. 4, line 18    Change "24-50" to --24.50--

Signed and sealed this 25th day of July 1972.

(SEAL)
Attest:

EDWARD M. FLETCHER, JR.      ROBERT GOTTSCHALK
Attesting Officer              Commissioner of Patents